United States Patent Office 3,389,146
Patented June 18, 1968

3,389,146
3-BENZYL HYDANTOINS
Kiyoshi Kitasaki, Garden Grove, and Robert F. Crawford, La Mirada, Calif., assignors to United States Borax & Chemical Corporation, Los Angeles, Calif., a corporation of Nevada
No Drawing. Filed Dec. 16, 1964, Ser. No. 418,866
9 Claims. (Cl. 260—309.5)

ABSTRACT OF THE DISCLOSURE 3-benzylhydantoins having a lower alkyl substituent at the 5-position of the hydantoin ring. The benzyl group can be chlorinated or it can have a lower alkyl radical on the α-carbon atom. The compounds are useful as herbicides.

This invention relates to novel 3-benzyl hydantoin compounds and herbicidal compositions and methods utilizing said benzyl hydantoins.

According to the present invention, there are provided novel 3-benzyl hydantoin compounds of the formula

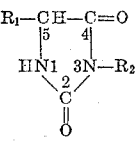

where $R_1$ is lower alkyl of from 1 to 3 carbon atoms, and $R_2$ is a benzyl group. Thus, the substituent at the 3-position is a benzyl group such as the benzyl radical, the chloro derivatives thereof, preferably those having no more than two chloro substituents, and the alpha-lower alkylbenzyl radicals such as α-methylbenzyl, α-ethylbenzyl, and α-methyl-2-chlorobenzyl. Examples of substituents at the 5-position, represented by $R_1$, are methyl, ethyl, n-propyl and isopropyl.

There are also provided novel herbicidal compositions and methods utilizing the 3-benzyl hydantoins.

The hydantoins of the present invention are normally crystalline solids which are soluble in the usual organic solvents, such as alcohols, ethers, and aromatic hydrocarbons. They are readily prepared by cyclization of the corresponding hydantoate with dilute mineral acid such as aqueous hydrochloric acid. The hydantoate is prepared by first converting the appropriate amino acid ester to the corresponding isocyanato compound which is then reacted with the corresponding benzylamine to give the hydantoate.

The following equations illustrate the general scheme of preparation:

(A)
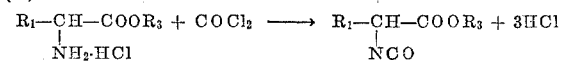

(B)
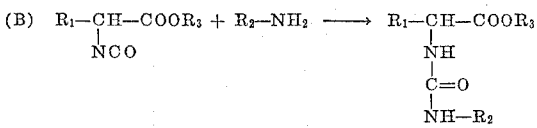

(C)
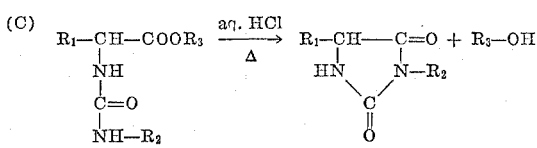

where $R_3$ preferably is a lower alkyl group and $R_1$ and $R_2$ have the significance previously assigned.

In the reaction illustrated by Equation A, the isocyanato compound is formed by the known reaction of the amino acid ester with phosgene in a relatively high boiling solvent, such as toluene, xylene, or the like. The isocyanato compound is then reacted with the benzylamine in the presence of an inert solvent such as ether, benzene or toluene at ambient or elevated temperature such as the reflux temperature of the solvent as illustrated by Equation B. It is not necessary to isolate the hydantoate since, after removing most of the solvent, it can be heated at an elevated temperature with aqueous mineral acid such as hydrochloric acid to form the corresponding substituted hydantoin as illustrated by Equation C. The normally water-insoluble crystalline hydantoin is removed by conventional procedures and purified by recrystallization from an appropriate solvent such as alcohol-water mixtures.

The benzyl hydantoins of this invention are effective herbicidal compounds useful for controlling weed growth. "Weeds" as used herein is intended to include any plant growth which is undesirable. The compounds are useful as a pre-emergence or a post-emergence treatment; that is, they can be used to kill growing plants or they can be used to kill or prevent the emergence of seedlings of the plants. Thus, the compounds can be used to control the growth of weeds by applying a phytotoxic amount to the locus of the weeds, that is, the foliage of the growing plants or soil in which the plants are growing or will grow.

An application rate in the range of from about 1 to about 50 pounds of one or more of the active compounds per acre is generally an effective phytotoxic amount, although greater or lesser amounts can be used if desired. The presently preferred application rate is in the range of from about 4 to about 25 pounds per acre.

The following examples are presented to illustrate the preparation of and herbicidal activity of typical compounds of this invention, but it is to be understood that the invention is not limited to the specific examples given.

EXAMPLE I

Ethyl 2-isocyanatopropionate

A suspension of 159 grams (1.01 moles) of ethyl 2-aminopropionate hydrochloride in 1.5 liter of toluene was refluxed for two hours with a Dean-Stark trap to remove traces of water and ethanol. Phosgene was then bubbled into the refluxing solution for six hours. The mixture was cooled, filtered and concentrated at reduced pressure. Distillation of the residual oil at 69°–74° C./19 mm. yielded 92.7 grams (64%) of the desired product; $n_D^{24}$ 1.4181.

3-benzyl-5-methylhydantoin

A solution of 14.4 grams (0.1 mole) of ethyl 2-isocyanatopropionate in 100 ml. of benzene was added dropwise to a solution of 10.8 grams (0.1 mole) of benzylamine in 100 ml. of benzene. The reaction mixture was refluxed for 2.5 hours and then concentrated to dryness under reduced pressure. The residual hydantoate was refluxed for three hours in 50 ml. of 6 N hydrochloric acid solution. The acid solution was concentrated and the solid product was recrystallized from isopropyl alcohol to give 20.4 grams (99%) of the crude product; M.P. 76°–89° C. After recrystallization from absolute ethanol the compound melts at 113°–114° C.

The compound was dissolved in methanol and applied as a pre-emergence treatment at a rate of 7.5 pounds of hydantoin per acre, to oats, rye grass, millet, mustard, peas and cucumbers. Twenty-nine days after treatment, all plants were dead or had not emerged.

EXAMPLE II

3-(2-chlorobenzyl)-5-methylhydantoin

A mixture of 5.3 grams (0.037 mole) of ethyl 2-isocyanatopropionate and 5.7 grams (0.04 mole) of 2-chlorobenzylamine in 50 ml. of benzene was refluxed for two hours. Benzene was removed under reduced pressure and the residue was refluxed for four hours with 25 ml. of 6 N hydrochloric acid and 25 ml. of ethyl alcohol. The hot acidic solution was filtered and then cooled. The precipitated product was separated by filtration, washed with water and dried; M.P. 116°–118° C.; yield 7.4 grams (83%).

The compound was applied as a pre-emergence treatment, at a rate of 25 pounds per acre, to flats planted to millet, rye grass, oats, mustard, cucumber and snap bean plants. Twenty-four days after treatment, a complete kill or non-emergence of all species was observed.

EXAMPLE III

3-(4-chlorobenzyl)-5-methylhydantoin

A mixture of 5.3 grams (0.037 mole) of ethyl 2-isocyanatopropionate and 5.7 grams (0.04 mole) of 4-chlorobenzylamine in 50 ml. of benzene was refluxed for two hours and then concentrated to dryness. The residue was refluxed for four hours with 25 ml. of 6 N hydrochloric acid and 25 ml. of ethyl alcohol. The hot acidic solution was filtered and then cooled. The solid product which crystallized was separated by filtration, washed with water and dried; M.P. 139°–140° C.; yield 7.6 grams (86%).

At an application rate of 15 pounds per acre, as both a pre-emergence and post-emergence treatment, to mustard plants, a complete kill or non-emergence of the plants was observed twenty-four days after treatment.

EXAMPLE IV

3-(α-methylbenzyl)-5-methylhydantoin

A mixture of 5.3 grams (0.037 mole) of ethyl 2-isocyanatopropionate and 4.8 grams (0.04 mole) of α-methylbenzylamine in 50 ml. of benzene was refluxed for two hours. The solvent was removed under reduced pressure and the residue was refluxed for six hours with 20 ml. of 6 N hydrochloric acid and sufficient ethyl alcohol to obtain a clear hot solution. The acidic solution was concentrated to an oil. The oily product was extracted with benzene and the combined benzene solution was dried over anhydrous potassium carbonate. The solution was concentrated and the residual oil was distilled at 175°–176° C. (0.6 mm.). The distillate solidified on standing.

When the compound was applied as a post-emergence treatment, at a rate of 6 pounds per acre, to mustard and corn, a complete kill of all mustard plants was obtained with only slight injury to some of the corn plants.

EXAMPLE V

Ethyl-2-isocyanatobutanoate

A solution of 160 grams (0.955 mole) of ethyl 2-aminobutanoate hydrochloride in one liter of toluene was refluxed and traces of water and ethanol were removed using a Dean-Stark trap. Phosgene was then bubbled into the refluxing solution for six hours. Toluene was removed under reduced pressure. The residue was refluxed for three B.P. 88°–91° C./16 mm., to give 125.1 grams (79.5%) of the product; $n_D^{24}$ 1.4216.

3-benzyl-5-ethylhydantoin

To a solution fo 5.9 grams (0.05 mole) of benylamine in 100 ml. of benzene was added 7.8 grams (0.05 mole) of ethyl 2-isocyanatobutanoate. The mixture was refluxed for 0.5 hour and benzene was then removed by distillation under reduced pressure. The residue was refluxed for three hours in 25 ml. of 6 N hydrochloric acid and cooled. The acidic solution was decanted and the residual solid was recrystallized from isopropanol-water mixture; M.P. 100°–104° C.; yield 7.9 grams (72.5%).

The compound was applied, as both a pre-emergence and post-emergence treatment at a rate of 15 pounds per acre, to millet, oats, mustard and cucumber plants. All plants were killed as the result of both treatments.

EXAMPLE VI

Ethyl 2-isocyanato-3-methylbutanoate

Phosgene was bubbled into a refluxing solution of 355 grams (2.12 moles) of ethyl 2-amino-3-methylbutanoate hydrochloride in 1500 ml. of toluene over a seven hour period. The solution was concentrated, filtered and fractionated to give 240.2 grams (66.4% yield) of the desired ester, B.P. 95°–98° C./23 mm.; $n_D^{24}$ 1.4257.

3-benzyl-5-isopropylhydantoin

Ethyl 2-isocyanato-3-methylbutanoate (7.96 g.; 0.05 mole) was added dropwise to a stirred solution of 5.4 grams (0.05 mole) of benzylamine in 100 ml. of benzene. The mixture was refluxed for 2.5 hours and then concentrated to dryness. The residue was refluxed for 2.5 hours in 30 ml. of 6 N hydrochloric acid and the acid solution was concentrated in vacuo. The residual oil was dissolved in ethyl alcohol and ethyl alcohol was removed under reduced pressure to remove traces of water. The ethyl alcohol treatment was repeated and a solid residue was obtained. This solid was recrystallized from cyclohexane to give 7.7 grams (66.5% yield) of the hydantoin, M.P. 85°–88° C.

The compound was applied as a pre-emergence treatment, at a rate of 7.5 pounds per acre, to a flat planted with corn, oats, rye grass, millet, mustard, peas, cucumber and snap beans. A complete kill or non-emergence of all plants was observed.

EXAMPLE VII

3-(2-chlorobenzyl)-5-isopropylhydantoin

To a solution of 7.1 grams (0.05 mole) of 2-chlorobenzylamine in 200 ml. of benzene, 8.0 grams (0.05 mole) of ethyl 2-isocyanato-3-methylbutanoate was added and the mixture was refluxed for 0.5 hour. Benzene was removed in vacuo and the residue was refluxed for four hours in 40 ml. of 6 N hydrochloric acid. The acidic solution was decanted and the solid product was recrystallized from an ethyl alcohol-water mixture to give 9.1 grams (72%) of the hydantoin; M.P. 103°–122° C. The product melted at 126°–129° C. after further recrystallization.

The compound was applied as a post-emergence treatment at a rate of 25 pounds per acre, to rye grass, mustard, peas, cucumbers and snap beans. A complete kill of all plants was observed.

EXAMPLE VIII

3-(2,4-dichlorobenzyl)-5-isopropylhydantoin

Ethyl 2-isocyanato-3-methylbutanoate (8.0 g.; 0.05 mole) was added to a stirred solution of 8.8 grams (0.05 mole) of 2,4-dichlorobenzylamine in 100 ml. of benzene and the mixture was refluxed for 0.5 hour. Benzene was removed at reduced pressure and the residual hydantoate was refluxed for four hours in 40 ml. of 6 N hydrochloric acid. A solid product separated on cooling and the aqueous portion was decanted. The residual solid was recrystallized from an isopropyl alcohol-water mixture and 10.7 grams (74%) of recrystallized product was obtained; M.P. 143°–146° C.

The compound was applied at a rate of 15 pounds per acre, as a post-emergence treatment, to corn and mustard plants. Substantially all the mustard plants were killed with only slight injury to some of the corn plants.

Among the many other benzyl hydantoins embraced by the present invention, which can be prepared according to the procedures described above, are the following compounds:

3-benzyl-5-n-propylhydantoin, M.P. 110°–111° C.
3-(2-chlorobenzyl)-5-n-propylhydantoin, M.P. 117.5°–118° C.
3-(4-chlorobenzyl)-5-isopropylhydantoin, M.P. 135°–141° C.
3-(3,4-dichlorobenzyl)-5-n-propylhydantoin, M.P. 174°–175° C.
3-(3,4-dichlorobenzyl)-5-isopropylhydantoin, M.P. 138°–140° C.

Since a relatively small amount of one or more of the active benzyl hydantoins should be uniformly distributed over the area to be treated, the compounds preferably are formulated with conventional herbicidal carriers, either liquid or solid. Thus, the compounds can be impregnated on or admixed with a solid carrier such as lime, talc, clay, bentonite, calcium chloride, vermiculite, calcium carbonate, and the like. Alternatively, the compounds can be dissolved or suspended in a liquid carrier such as water, kerosene, alcohols, diesel oil, xylene, benzene, glycols and the like. A surfactant preferably is included to aid in dispersion, emulsification and coverage. The surfactant can be ionic or nonionic, and may be liquid or a solid. The use of the term "surfactant" herein is intended to include such compounds commonly referred to as wetting agents, dispersing agents and emulsifying agents. Typical surfactants include the alkylarylsulfonates, the fatty alcohol sulfates, sodium salts of naphthalenesulfonic acid, alkylaryl polyether alcohols, long chain quaternary ammonium compounds, sodium sats of petroleum-derived alkylsulfonic acids, polyoxyethylene-sorbitan monolaurate, and the like. These dispersing and wetting agents are sold under numerous trademarks and may either be pure compounds, mixtures of compounds of the same general group, or they may be mixtures of compounds of different classes. Surfactants can also be included in compositions containing a solid inert carrier.

Concentrated compositions containing the active herbicidal agent which can be subsequently diluted, as with water, to the desired concentration for application to plants and soil are also provided. The advantages of such concentrates are that they are prepared by the manufacturer in a form such that the user need only mix them with a locally available carrier, preferably water, thereby keeping shipping costs to a minimum while providing a product which can be used with a minimum of equipment and effort. Such concentrates may contain from about 5 to about 99 percent by weight of one or more of the active benzyl hydantoins with a carrier or diluent, which may be a solid or liquid. Liquid carriers which are miscible with the active agent or other liquids in which the compound may be suspended or dispersed may be used. A surfactant is also generally included to facilitate such dilution or dispersion in water. However, the surfactant itself may comprise the carrier in such concentrates.

The herbicidal compositions can include other beneficial adjuvants, such as humectants, oils and contact agents. Also, other herbicides, such as sodium chlorate, borax and sodium metaborate, 2,3,6-trichlorobenzyloxypropanol, the chlorophenoxyacetic acids, trichlorobenzoic acids, substituted ureas, triazines, uracils and carbamates, can be included in the formulations.

The following examples are presented to illustrate the preparation of suitable herbicidal compositions of this invention.

EXAMPLE IX

|  | Percent |
|---|---|
| 3-benzyl-5-methylhydantoin (powdered) | 5 |
| Granular clay | 95 |

A granular formulation can be prepared by dry blending the above constituents until uniformly mixed in a rotary mixer. A fine spray of water is sprayed onto the mixture, while tumbling to adhere the compound to the clay. The material is then air dried while tumbling to give a granular formulation which can be applied to the soil or vegetation by hand or by a mechanical spreader.

EXAMPLE X

|  | Percent |
|---|---|
| 3-benzyl-5-ethylhydantoin | 85 |
| Bentonite clay | 14 |
| Sodium lauryl sulfate surfactant | 1 |

A wettable powder formulation can be prepared by micronizing the hydantoin and mixing uniformly with powdered bentonite clay and powdered sodium lauryl sulfate. The wettable powder can be added to water or hydrocarbon oil and mechanically agitated to insure a uniform dispersion which can be sprayed with conventional equipment on soil or vegetation.

EXAMPLE XI

|  | Percent |
|---|---|
| 3-(α-methylbenzyl)-5-methylhydantoin | 15 |
| Polyoxyethylenesorbitan monolaurate | 2 |
| Isopropanol | 30 |
| Xylene | 53 |

The hydantoin is dissolved in a mixture of isopropanol and xylene to form a concentrated solution. The emulsifying agent is then dissolved and a liquid formulation of an emulsifiable concentrate is obtained. The emulsified concentrate can be added to water to dilute to a desired concentration, and then be sprayed with conventional equipment on soil or vegetation.

EXAMPLE XII

|  | Percent |
|---|---|
| 3-benzyl-5-isopropylhydantoin | 4 |
| Sodium tetraborate pentahydrate | 96 |

Granular sodium tetraborate pentahydrate is dry blended with the powdered hydantoin. Five percent water is added to the blended mixture to adhere the hydantoin to the granular borate and the mixture then air-dried. The granular formulation can be applied by hand or with a mechanical spreader to the soil or on vegetation.

Various changes and modifications of the invention can be made and, to the extent that such variations incorporate the spirit of this invention, they are intended to be included within the scope of the appended claims.

We, therefore, claim as our invention:

1. A compound of the formula

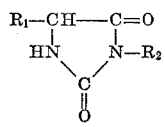

where $R_1$ is lower alkyl of from 1 to 3 carbon atoms and $R_2$ is a benzyl group selected from benzyl, chlorobenzyl and α-lower alkylbenzyl.

2. A compound according to claim 1 in which said benzyl group has 1–2 chloro substituents.
3. 3-benzyl-5-methylhydantoin.
4. 3-benzyl-5-isopropylhydantoin.
5. 3-(α-methylbenzyl)-5-methylhydantoin.
6. 3-(2-chlorobenzyl)-5-isopropylhydantoin.
7. 3-benzyl-5-ethylhydantoin.
8. 3-(2-chlorobenzyl)-5-methylhydantoin.
9. 3-(2,4-dichlorobenzyl)-5-isopropylhydantoin.

(References on following page)

References Cited

UNITED STATES PATENTS 2,759,002  8/1956  Close _____ 260—309.5

FOREIGN PATENTS 644,032  7/1962  Canada.
1,039,302  3/1959  Germany.

OTHER REFERENCES

Vita et al., Jour. Med. Chem., vol. 7, pp. 468–71, July 1964.

JOHN D. RANDOLPH, *Primary Examiner.*

WALTER A. MODANCE, *Examiner.*

N. TROUSOF, *Assistant Examiner.*